March 26, 1946.   E. G. TOUCEDA   2,397,168
METHOD OF MAKING DIES FOR THE INJECTION MOLDING OF PLASTICS
Filed Dec. 26, 1942    2 Sheets-Sheet 1
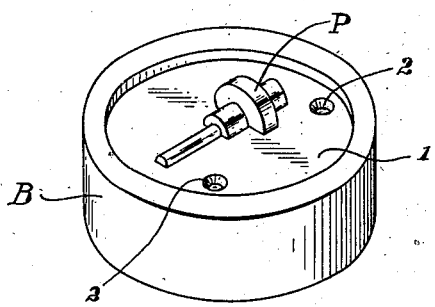
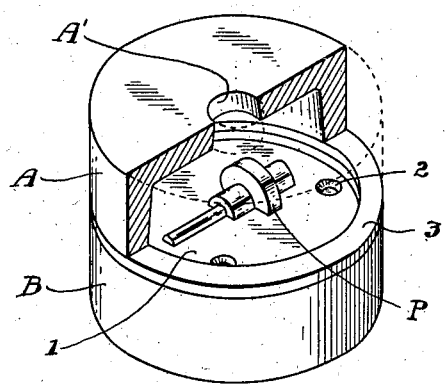
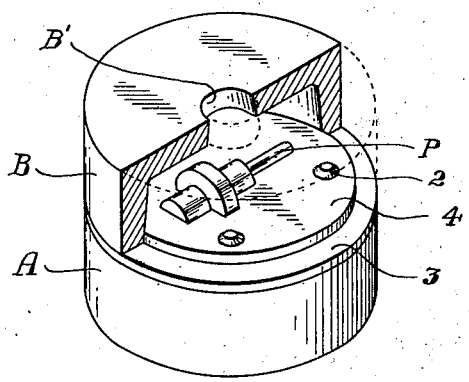
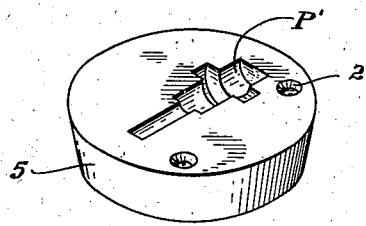
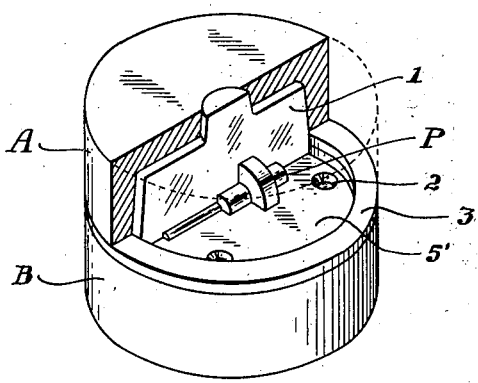
Enrique G. Touceda
INVENTOR
BY
ATTORNEY March 26, 1946.    E. G. TOUCEDA    2,397,168
METHOD OF MAKING DIES FOR THE INJECTION MOLDING OF PLASTICS
Filed Dec. 26, 1942    2 Sheets-Sheet 2

Enrique G. Touceda
INVENTOR
BY
ATTORNEY

UNITED STATES PATENT OFFICE 2,397,168

METHOD OF MAKING DIES FOR THE INJECTION MOLDING OF PLASTICS

Enrique G. Touceda, United States Navy

Application December 26, 1942, Serial No. 470,272

9 Claims. (Cl. 76—107)

(Granted under the act of March 3, 1883, as amended April 30, 1928; 370 O. G. 757)

This invention relates to a die-making method primarily for use in the injection molding of plastics and to dies made by this method.

An object of the invention is to produce dies which accurately reproduce the intricate details of complex patterns at a minimum cost and with a minimum expenditure of time and labor.

Another object is to provide a material that may be used in die making, which may be caused to be softened at a predetermined temperature and then caused to become hard at lower temperature and to remain so at operating temperatures.

Another object is to provide a material that may be used in pattern making which has minimum shrinkage, when applied by pressure means, and low total contraction.

Another object is to provide materials for segmental dies which materials may be used at temperatures of injection above 200° F.

Pressure methods of producing segmental dies have been known. It has been impossible to use the assembled finished die, however, for the purpose of producing plastic parts by injection means where the injection temperatures required are substantially in excess of 200° F. The present invention, however, provides dies which may be assembled in segments and the assembly used at temperatures above that figure.

Formerly in making dies for the injection method of molding plastics, it has been necessary to employ the services of skilled workmen and to provide the most precise machine-tool equipment. Obviously, there is, at the present time, a great lack of both these elements, so that any procedure is important that has as its objective the saving of skilled labor, machine-tool equipment, and, most important of all—time.

Also in making dies by the die sinking method, it is necessary to use high grade steels, difficult to machine. If the die is complicated in design, considerable time has to be spent in machining and grinding out the details. Also, after the machine work has been completed, time has to be spent in hardening and finishing the die. The process is difficult, and for complicated dies several weeks are required.

The process herein disclosed eliminates from die making the great time-consuming element—machine work. It substitutes a simplified casting process which is very rapid, and which can be handled by semi-skilled labor, a tremendous factor in our rearmament program because of the length of time necessary for training skilled workers.

A single cavity die can be produced by the present method in one-tenth of the time required in the standard die-sinking process and complicated dies may be made at a still greater saving in time. Many dies can be completed by this process in less than one working day.

Also in producing dies by the conventional methods, the highest salaried type of machinist is required, as well as expensive machine-tool equipment. The present method reduces the cost because, (a) it is a much faster process, (b) it can be operated with cheaper labor, and (c) it requires only relatively inexpensive equipment.

A saving of at least 75% in cost can be realized, depending upon the type of work contemplated.

Also, at present there is an obvious shortage of machine-tool equipment as well as a crying need for skilled labor. In the process disclosed, the equipment is inexpensive and can be operated with unskilled labor, once the mold has been designed. Due to the great volume of work now being nationally planned and to the speed at which dies can be made by this new method, a large saving is possible—up to 90% in unit cost.

Also in the conventional methods of die making, it is not possible to make parts of complicated design, both by reason of the limitation of machine-tool processes and the great expense in making such dies. In the process disclosed, dies can be made having no draft. Also, designers, knowing of the availability of the process, will be able to design with more latitude—an important consideration in this field.

Also because copper-beryllium is used as a die material in the present method, it will speed up the procedure used in making parts by injection molding, especially those using the thermoplastics such as "Lucite" which require that the die be cooled before the part can be removed. In the new process this step will be accomplished rapidly by reason of the high thermal conductivity of copper which provides faster heating and faster cooling than the previously used steel dies, or those made from pressed metallic powders.

By making patterns of steel dies, said dies can be duplicated in plastics; the plastic patterns invested in plaster compounds (special investments); the plastic patterns burnt out of the investment and steel cast in the void by centrifugal or pressure methods. Also machine-tool parts such as drills, milling cutters, etc., can be made from duplicate plastic patterns. Wax does not stand up satisfactorily in large patterns, whereas patterns made of plastics do. This, too, is a great advantage for designers because larger parts may now be designed.

The invention has, therefore, application to the making of plastic articles to be used in their finished condition or to be used as accurate patterns for duplication in special alloys.

With the present invention, an object of almost any degree of complexity may be used as an initial pattern.

Fig. 1 is a perspective view of a part mounted in position in casing.

Figs. 2, 3 and 5 with portions cut away exhibit successive periods in the method.

Fig. 4 is a perspective view of a wax form made in the lower half of the casing.

Figure 6:
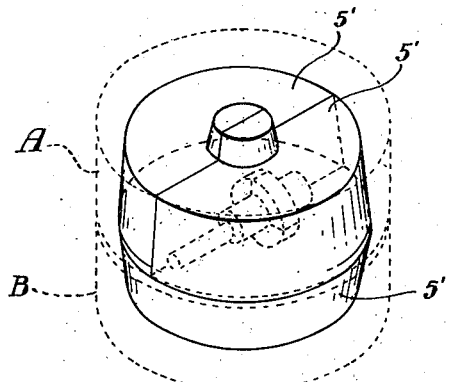
Fig. 6 is a perspective view of the three segments of a copper-beryllium die and a part assembled for compression in a casing which is shown in dotted lines.

Part P is taken as a pattern for mass reproduction, e. g., in plastic. In a casing, B (see Fig. 1), which may be for example steel or grey iron, not quite half of pattern P is mounted as shown in "Plastecene" or similar substance. Standard "Plastecene" usually consists of zinc oxide and sulphonated olive oil, and it costs about sixty cents per pound. It has been found that a mixture of bentonite and from 5% to 10% glycerine gives more satisfactory results and costs approximately ten cents per pound. This compound may be used for an indefinite period of time, for its physical properties do not substantially change with use and time.

Two small spot depressions 2, 2, may be made on the surface of the "Plastecene" in convenient locations to hold the finished segments of the mold in accurate assembly.

Next a shim 3 is placed on the rim of casing B and casing A is fitted onto this shim, with inlet hole at the top, as shown in Fig. 2.

Casing A is filled with plaster of Paris or similar material through inlet A', and vibrated and the plaster then allowed to set. The paster of Paris covers pattern P a small distance below the center line. Next the casings are separated and all the "Plastecene" is removed from casing B.

Casing A, containing the hardened plaster of Paris 4, is inverted with pattern P and shim in place as shown in Fig. 3.

Casing B is placed on the shim over casing A with inlet B' at the top as shown in Fig. 3. The composition of the wax used is such that it has a grease-like consistency at the arrest point in its cooling curve and can be forced under pressure at this point into the mold. If the wax used were completely melted and squirted in the mold shrinkage would occur and the finished pattern would in consequence be under size.

Wax 5 forms the under contour P' of pattern P. The casings are separated and the entire body of the wax removed. It appears as shown in Fig. 4.

The wax pattern 5 is next invested in a plaster compound (special investment) which, after setting is heated for the purpose of melting out the wax and expanding the investment an amount equal to the contraction which will be experienced by copper-beryllium when it is subsequently cast by centrifugal or pressure methods into the resulting void. A beryllium-copper duplicate of the wax pattern is thus formed.

The copper-beryllium duplicate 5' may be pickled in dilute HCl, washed in ammonia and water, and dried before being inserted into casing B. It takes up exactly the space formerly occupied by the wax.

Pattern P is placed in the copper-beryllium duplicate 5' and "Plastecene" 1 is formed over any selected part of the exposed portion of pattern P, depending upon the plane selected for parting. In the example shown the portion selected is not quite half of the exposed part of pattern P. See Fig. 5.

The casings being reassembled as shown in Fig. 5, plaster of Paris is introduced into casing A to fill the void around the remaining uncovered portion of pattern P. The "Plastecene" 1 is then removed and wax is injected into the space it occupied. This wax pattern is in turn removed and duplicated in copper-beryllium, forming another segment of the mold.

The next step is the removal of the rest of the plaster of Paris and the reassembling of the casings containing the two completed copper-beryllium segments, with part P and shim in place. Wax is then introduced into the void left by the removal of the plaster of Paris. This wax pattern is in turn removed and duplicated in copper-beryllium to form the third and last segment of the mold. The number of segments is not necessarily three. There may be two or more depending upon the complexity of the pattern.

Copper-beryllium, after being duplicated by the methods aforementioned, has a hardness of about B77 Rockwell. In order to put it in its softest condition it is then heated to about 1500° F. and quenched causing the hardness to drop to about B65 Rockwell. At this hardness it is soft enough to conform to any contour under pressure.

Figure 7:
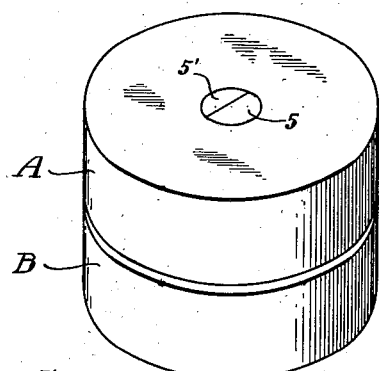
Fig. 7 is a perspective view of a casing with the shim removed.

The three copper-beryllium segments, 5', 5', 5', are now assembled in the upper and lower casings around pattern P, with shim removed, as illustrated in Figs. 6 and 7.

The casings together with their assembled mold segments are pressed in a hydraulic press at about 5,000 pounds per square inch pressure. This procedure causes the parts of the mold to flow sufficiently to close any voids at their intersections, and to flow with the greatest fidelity around all contours of the pattern.

Figure 8:
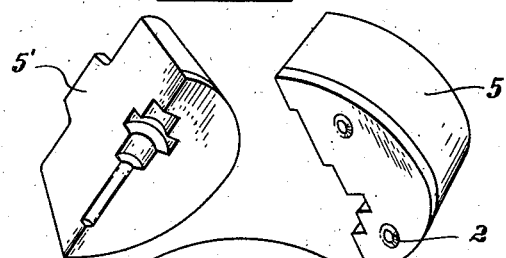
Fig. 8 is an exploded persepective view of the three segments shown in Fig. 6.

The segments of the mold are then removed and a sprue 6 is made in one of them (see Fig. 8). The position of the sprue obviously depends upon the design of the particular part to be duplicated.

Figure 9:
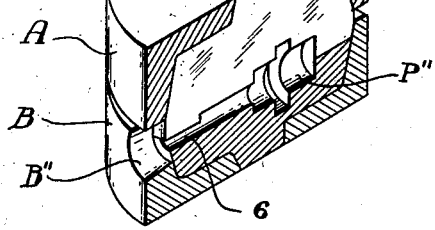
Fig. 9 is a perspective view with a portion cut away along a cross section of the mold through the partition between the two smaller segments, showing an opening in the casing for access to a sprue in the die.
Figure 10:
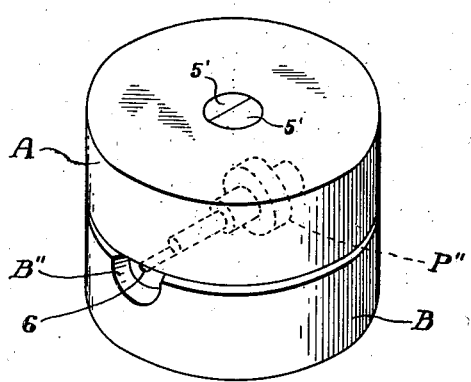
Fig. 10 is a perspective view of the assembled mold ready for use.

Fig. 9 includes a cross section of the mold through the longitudinal axis of the void P'' formed by pattern P and shows the sprue 6 and part of the rim of casing B cut away, at B'', to give access to the sprue.

The entire assembly including pattern P, is then heated to from 550°–600° F. for about two hours. The three copper-beryllium segments are thus caused to become hard by the well known phenomenon of "precipitation hardening." The mold is then cooled, opened, and pattern P removed, leaving the finished die ready to be assembled into an injection molding machine. Fig.

10 shows the mold assembled and ready for use.

It must be pointed out that any alloy capable of being put into a soft state and subsequently being capable of being hardened at a low temperature by "precipitation" could be used for the purpose of making dies by the method set forth. Such an alloy could be Duralumin. So far as is known, however, there is no alloy available which is capable of being softened and in such state capable of flowing under pressure; said alloy also being capable of hardening to Rockwell C45 and used at that hardness in temperature ranges up to 500° F. Beryllium-copper is peculiarly unique in this regard.

As pointed out the invention has application to the making of plastic articles to be used in their finished condition or to be used as accurate patterns for duplication in special alloys.

The process herein disclosed may be varied within obvious limits, to suit requirements without departing from the scope of the appended claims.

This invention may be used by or for the Government of the United States for governmental purposes without the payment to me of any royalty thereon or therefor.

What I claim is:

1. A method comprising the steps of imbedding a pattern nearly to its midsection in "plastecene" in one half of a mold casing, placing a shim over the edge of said half, placing the other half of the casing on said shim, filling said upper half with plaster of Paris through an opening at its top, vibrating and allowing the plaster of Paris to set, turning the mold casing over, removing the "plastecene" and replacing the lower half of casing in place, injecting a wax consisting substantially of paraffin and opal into said half, removing said wax pattern and duplicating in copper-beryllium by pressure casting, pickling said duplicate, inserting it in the lower half of the mold casing, removing plaster of Paris from the other half, placing the pattern in the void in the copper-beryllium, forming "plastecene" over any selected part of the pattern in said upper half, filling the rest of the upper half of mold casing with plaster of Paris, removing the "plastecene" and injecting wax in its place, removing said wax pattern and casting in copper-beryllium, removing plaster of Paris, reassembling the casing with two completed segments of copper-beryllium with shim in place, injecting wax into the remaining void, removing this wax pattern and casting it in copper-beryllium in the same manner as the other two segments; reducing the hardness of all said segments to about B65 Rockwell, assembling the segments around the pattern in the casing with the shim removed, pressing the casing halves together under a pressure of approximately 5,000 lbs. per sq. in., removing the segments, forming a sprue in one of them in a suitable position, and removing a portion of the casing for access to said sprue, reassembling the parts with the pattern, heating at 550°–600° F. for about two hours, whereby the copper-beryllium sections are hardened to about Rockwell C-45 by precipitation hardening, cooling the mold and removing the pattern therefrom.

2. A method of making dies comprising making a mold of a plurality of segments of copper-beryllium about a pattern, reducing the hardness of these segments to about B65 Rockwell, compressing the segments over the pattern so as to get a better impression of the details of the pattern in the mold and rehardening the segments with the pattern in place by heating it to about 550° to 600° F. for about two hours.

3. A method of making dies comprising making a mold of two or more segments of copper-beryllium about a pattern, reducing the hardness of these segments to about B65 Rockwell, compressing the segments over the pattern so as to get a better impression of the details of the pattern in the mold, rehardening the segments with the pattern in place by heating it to between about 550° to about 600° F. for about two hours, cooling the mold and removing the pattern.

4. The method defined in claim 2 in which the reduction in the hardness of the copper-beryllium is produced by heating it to 1500° F. and quenching it.

5. A method of making a mold for use at temperatures of approximately 600° F. adapted to reproduce precisely a pattern comprising casting about the pattern a metallic mold approximately to correct shape and size, removing the pattern, heating the mold to solution temperature and cooling, replacing the pattern, compressing the mold about the pattern to precise shape and size and thereafter hardening the mold.

6. A method of making a segmental mold for use at temperatures of approximately 600° F. adapted to reproduce precisely a pattern comprising casting about the pattern beryllium-copper alloy segments approximately to correct shape and size, removing the pattern, heating the segments to solution temperature and cooling, replacing the pattern, compressing the segments about the pattern to precise shape and size and thereafter hardening the segments.

7. A method of making multiple segment dies capable of being used without substantial change in their room temperature characteristics and adapted to be softened by solution treatment so that the segments may be compressed and made to flow about a metallic pattern to get a precise impression of the details of the pattern comprising compressing the segments about the pattern and subsequently hardening them by the method of precipitation with the pattern in place.

8. A method of making multiple segment beryllium-copper alloy dies which are adapted to be used without substantial change in their room temperature characteristics and to be softened by solution treatment so that the segments may be compressed and made to flow about a metallic pattern to get a precise impression of the details of the pattern comprising compressing the segments about the pattern and subsequently hardening them by the method of precipitation with the pattern in place.

9. The segmental mold made by the method as defined in claim 2.

ENRIQUE G. TOUCEDA.